May 17, 1966  R. L. ARCHBOLD  3,251,500
REINFORCED PLASTIC TANK AND BRACKET MOUNTING ASSEMBLY
Filed July 18, 1962  2 Sheets-Sheet 1
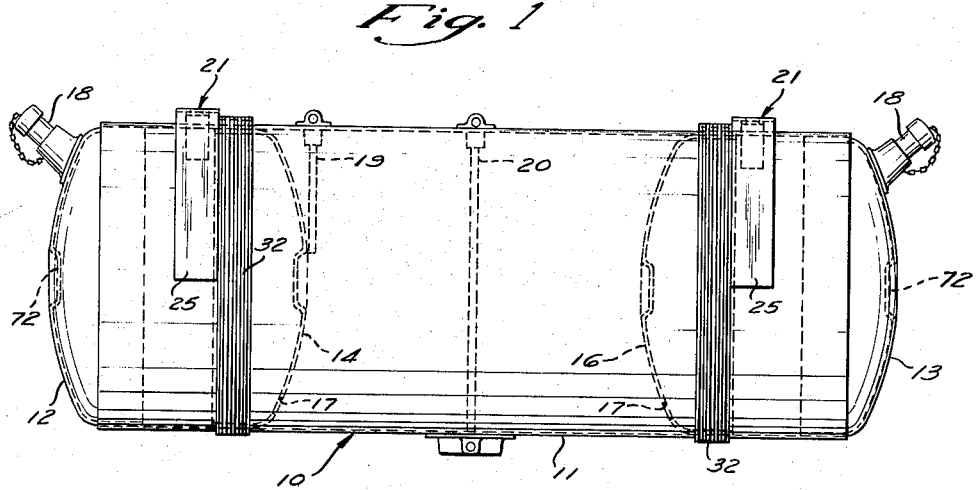
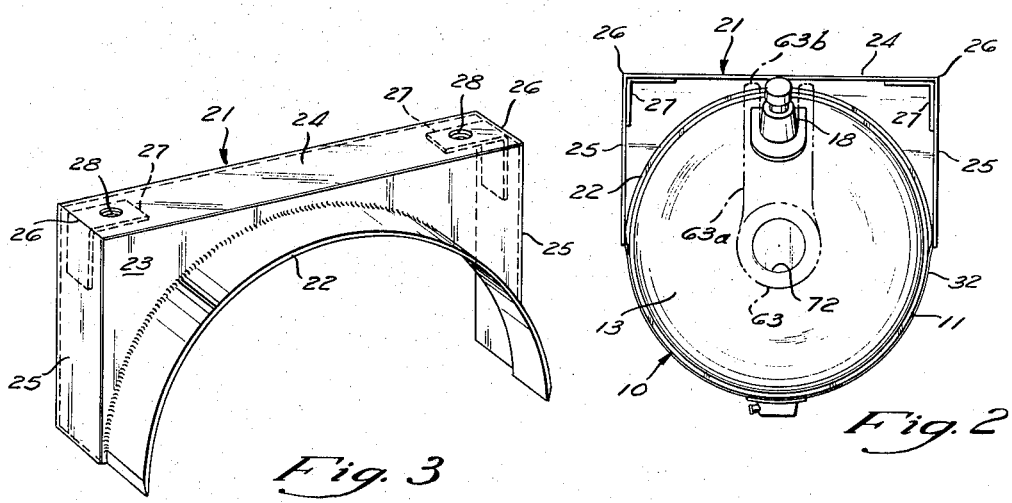
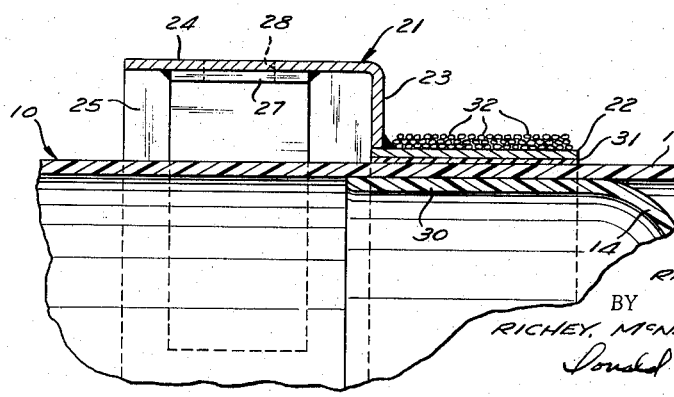
INVENTOR.
RALPH L. ARCHBOLD
BY
RICHEY, McNENNY & FARRINGTON
Donald W. Farrington
ATTORNEYS May 17, 1966  R. L. ARCHBOLD  3,251,500
REINFORCED PLASTIC TANK AND BRACKET MOUNTING ASSEMBLY
Filed July 18, 1962  2 Sheets-Sheet 2
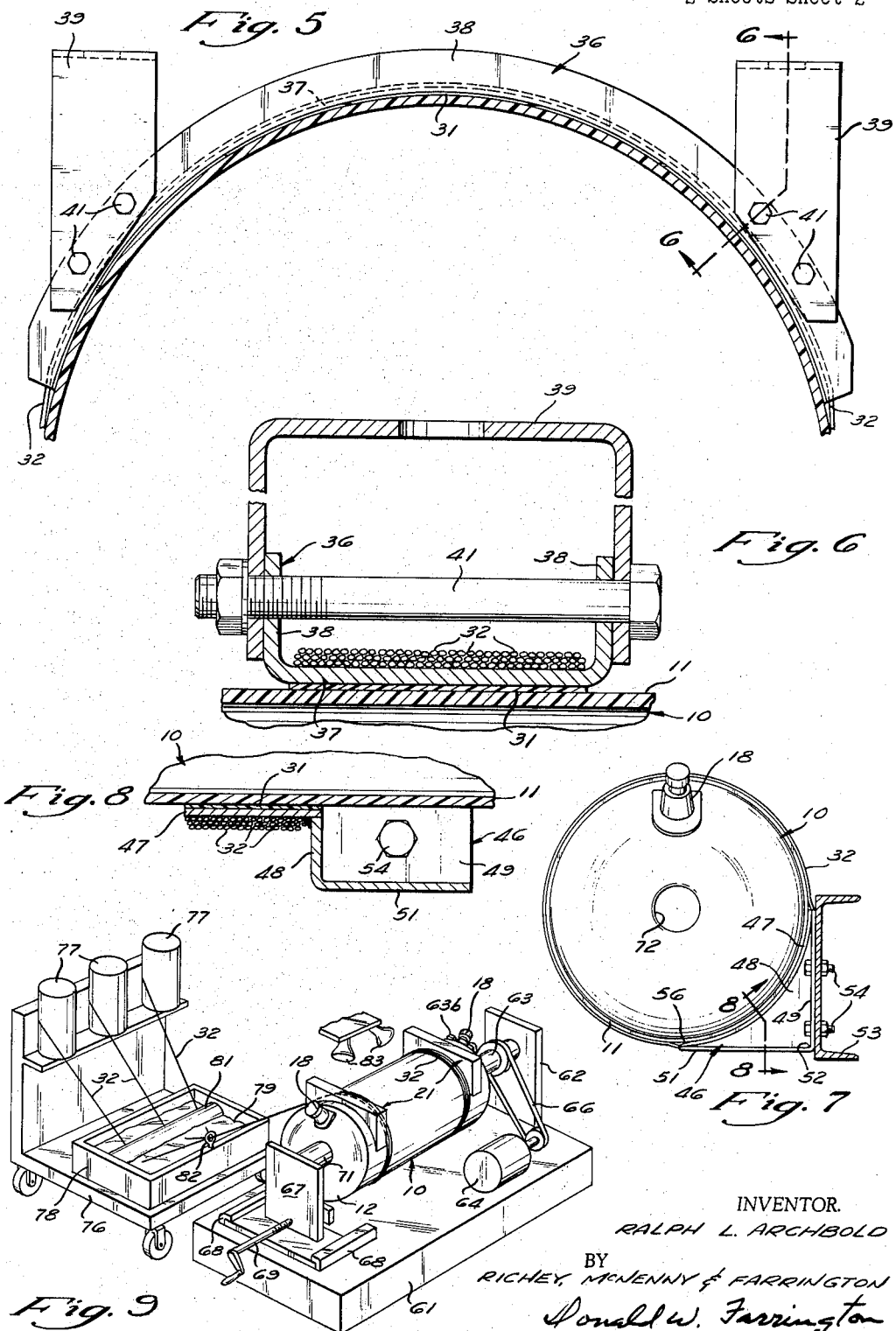
INVENTOR.
RALPH L. ARCHBOLD
BY
RICHEY, McNENNY & FARRINGTON
Donald W. Farrington
ATTORNEYS

United States Patent Office 3,251,500
Patented May 17, 1966

3,251,500
REINFORCED PLASTIC TANK AND BRACKET
MOUNTING ASSEMBLY
Ralph L. Archbold, Euclid, Ohio, assignor to White Consolidated Industries, Inc., a corporation of Delaware
Filed July 18, 1962, Ser. No. 210,660
9 Claims. (Cl. 220—1)

This invention relates generally to vehicle tanks and more particularly to a novel and improved tank formed of reinforced plasic of the general type known as fiber glass in combination with a bracket assembly for mounting such tanks on the frame of a vehicle.

A tank and mounting assembly incorporating this invention is particularly suitable for use in carrying liquids such as deisel fuel on tractor-trailers. Such tanks are subjected to considerable vibration when the trailer is travelling over the road. In addition, very severe shock loading occurs during the bumping in switching yards when the trailer is carried piggy-back on railroad flat-cars.

Iron and steel have a high modulus of elasticity in the order of twenty-seven million pounds per square inch to thirty million pounds per square inch while fiber reinforced plastics such as fiber glass have a low modulus of elasticity in the order of two and one-half million pounds per square inch. If fiber reinforced plastic tanks are mounted on steel supports, there is, due to the great difference in modulus of elasticity, a tendency for sharp bending to occur in the plastic. Since fiber reinforced plastic will fatigue if bending it locally excessive, failure can occur. Also, such material is readily damaged by abrasion. It is, therefore, unsatisfactory to mount fiber reinforced plastic tanks on metal support brackets unless special care is provided to prevent excessive localized bending or abrasion between the surface of the mounting bracket and the tank wall.

In a tank and mounting bracket assembly incorporating this invention, means are provided to eliminate abrasion failure and to prevent the occurrence of excessive localized bending so that tank failure is virtually eliminated even under the most severe operating conditions.

The tank proper may be formed in a manner disclosed in the patent to Wiltshire No. 3,012,922, dated December 12, 1961 and closed at its ends with preformed fiber reinforced plastic end members. Suitable baffles can also be installed within the tank to prevent excessive splashing of the liquid contained therein. It should be understood that it is contemplated that the tanks will normally be formed of glass fiber reinforced plastic resin known as fiber glass but that other suitable reinforcing materials can be used when desired and that this invention is not limited to tanks formed of fiber glass, per se. Therefore, the term "fiber glass" is intended to include similar fiber reinforced plastics employing fibers other than glass.

A tank and mounting assembly incorporating this invention is arranged so that the rigid mounting brackets are connected to the tank by filament windings having a modulus similar to the material of the tank. A reinforcing pad or cushion is also bonded between the tank and bracket in the area of engagement therebetween to prevent failure when the tank is subjected to shock or vibration loads.

It is an important object of this invention to provide a novel and improved tank and bracket assembly for mounting flexible tanks on a frame subjected to shock and vibration loads.

It is another important object of this invention to provide a novel and improved fiber reinforced plastic tank and bracket assembly suitable for use on large road vehicles.

It is still another object of this invention to provide a novel and improved vehicle fuel tank and bracket assembly wherein the mounting of the bracket on the tank prevents the occurence of stress concentration or abrasion which could cause rupture of the tank under vibration and shock loading conditions.

It is still another object of this invention to provide a fiber reinforced plastic tank and bracket wherein the bracket is formed with a flange positioned adjacent to the wall of the tank and secured in place by filament windings permanently bonded to the bracket and tank.

It is still another object of this invention to provide a novel and improved method and apparatus for securing rigid articles such as brackets and the like to fiber reinforced tanks in a manner to eliminate high stress concentrations and vbration failure of the tank.

It is still another object of this invention to provide a fiber glass tank and bracket assembly for use on trailer vehicles wherein the bracket is secured to the tank by a material having a modulus similar to the modulus of the tank to prevent stress concentration and fatigue in the tank wall.

It is still another object of this invention to provide a cylindrical fiber glass tank for mounting on a vehicle in combination with a bracket formed with a flange extending around said tank for less than one-half of the circumference thereof and positioned with a reinforcing cushion beneath the flange wherein the flange is connected to the tank by means of wrappings of filament material extending around the flange and tank and bonded in position by suitable resin.

Further objects and advantages will appear from the following description and drawings wherein:

FIGURE 1 is a side elevation of one form of tank and mounting bracket assembly;

FIGURE 2 is an end elevation of the structure illustrated in FIGURE 1;

FIGURE 3 is an enlarged perspective view of the bracket of FIGURES 1 and 2;

FIGURE 4 is an enlarged fragmentary section illustrating the structural details of the brackets and mounting thereof on the tank;

FIGURE 5 is an end view of a second form of bracket;

FIGURE 6 is an enlarged fragmentary section taken along the line 6—6 of FIGURE 5;

FIGURE 7 is an end view illustrating still a third form of bracket incorporating this invention;

FIGURE 8 is an enlarged fragmentary section taken along the line 8—8 of FIGURE 7; and FIGURE 9 is a perspective view schematically illustrating the apparatus for winding the filaments to mount the brackets on a tank.

Referring to FIGURES 1 through 4, the tank 10 is formed with a cylindrical wall 11, closed at its ends by end members 12 and 13. The cylindrical portion 11 may be formed in the manner disclosed in the United States patent to Wiltshire referred to above. The end members 12 and 13 are preferably preformed in molds and installed in the ends of the cylindrical wall 11 in a manner well known to the art. Similarly, baffles 14 and 16 which may be structurally similar to the end walls 12 and 13, are installed within the cylindrical wall portion 11. If desired these baffles may be imperforate to separate the tank into isolated compartments or formed with openings, as at 17, so that the baffles 14 and 16 function to prevent excessive movement of the liquid carried in the tank. Suitable filler caps 18 are provided at one or both ends of the tank and suitable vent and outlet pipes 19 and 20 respectively are also provided. It should be understood that other shapes and types of tanks can be used and that the tank shown is merely illustrative of one form of suitable tank.

In order to mount the tank on the frame of the vehicle oppositely facing spaced brackets 21 are mounted on the tank 10. The brackets 21 are preferably formed of aluminum or other suitable metal and having a structure best illustrated in FIGURE 3. The brackets 21 include a semi-circular flange 22 having a radius of curvature substantially equal to the radius of curvature of the outer surface of the cylindrical wall 11 and extending through an arc of approximately 180°. Welded to one edge of the flange 22 is a plate or end wall 23. The outer edges of the plate are bent normal to the plane of the plate to form top and side flanges 24 and 25, respectively, and welded at the corner edges 26. Reinforcing plates 27 are welded in position at the corner joints between the flanges 24 and 25. Mounting holes 28 extend through the top flange 24 and the reinforcing plates 27 to provide bolt holes for mounting of the bracket to the vehicle frame. The gauge of the metal used to form the brackets 21 is chosen to provide a substantially rigid structure.

Referring to FIGURE 4, a blanket 31 of plastic resin impregnated filament is placed between the inner wall of the flange 22 and the outer surface of the cylindrical wall 11 of the tank 10, to provide reinforcement in the area between the tank and the flange 22. This blanket provides additional strength in the area of the bracket and cushions the tank wall thereby reducing the tendency for excessive tank wall bending in the area of the bracket. The plastic resin in the blanket also forms a bond between the tank wall and bracket surface preventing relative movement therebetween and thereby eleminating abrasion of the plastic. A polyester resin is well suited for this purpose. It will be understood by those skilled in the art that other resins such as epoxy, polystyrene and some of the phenolic resins may be used.

In the embodiment illustrated in FIGURE 1 the baffles 14 and 16 are also mounted so that their flanges 30 are bonded to the inner wall of the tank under the bracket flanges 22. This provides additional strength in the area of the bracket.

Wrapped around the entire tank and flange 22 are windings 32 preferably formed of continuous filaments of the same material used to reinforce the wall of the tank 10. These filaments are bonded in position with a suitable resin, generally the same resin used to impregnate the blanket 31. Since the windings 32 are formed of flexible filaments suitably bonded by a plastic resin, the windings and bonding resin form a mat having a modulus similar to that of the wall of the tank 10. Therefore, any flexing of the wall 10 due to shock or vibration load supplied to the tank merely results in flexing of the windings in the area along the engagement between the windings and the tank itself. As a result, there is no shifting or abrasion between the windings and the wall of the tank. Also the windings are formed of filaments extending along the windings so maximum strength in tension is provided. Thus the windings 32 supports the tank loads preventing tension or shear failure of the bond formed by the resin in the blanket 31.

The brackets 21 are mounted on the top of the tank and extend only down to substantially the mid-point on both sides thereof. As a result, the supporting loads are carried by the windings 32 to the flange 22. Since the principle load of the liquid within the tank is along the lower surface spaced from the brackets 21 and since these are the loads which produce flexing of the tank wall, the maximum flexing occurs at points spaced from the substantially rigid bracket 21. As a result, sharp bending of the wall of the tank does not occur and the resulting assembly is capable of withstanding severe vibration and shock loads without failure.

Reference should now be made to FIGURES 5 and 6, in which another form of bracket is disclosed. The bracket of FIGURE 5 and FIGURE 6 is formed as a U-shaped channel 36 having a bottom wall 37 shaped to closely fit the cylindrical wall 11 of the tank 10 and laterally extending opposed flanges 38 bent from the wall 37 to provide stiffness for the bracket. Here again, a blanket 31 is positioned between the wall 37 and the wall 11 of the tank 10 and windings 32 secure the bracket to the tank. In this embodiment, the windings are located between the lateral walls 38. To secure the bracket to the vehicle frame, mounting elements 39 also formed with a U-shaped section are bolted to the lateral walls 38 by bolts 41. The mounting elements are mounted until after the windings 32 since they would interfere with the winding operation.

In FIGURES 7 and 8, a third form of mounting bracket 46 is illustrated which is used when the tank must be mounted beside the vehicle frame rather than suspended beneath it. The bracket 46 is formed with a flange 47 having a radius of curvature substantially the same as the radius of curvature of the wall 11 of the tank and a plate 48 welded thereto at one edge. Side and bottom flanges 49 and 51 are bent from the plate 48 at right angles and are welded at the corner 52 to form the box section. The side flange 51 is fastened to a vehicle frame 53 by bolt fasteners 54. The flange 47 of this embodiment extends downward from the mid-plane of the tank through an arc of approximately 90° to the bottom of the tank. Here again, windings 32 secure the bracket 46 in position and a blanket 31 provides a bonded connection between the tank wall and the bracket to cushion, reinforce and prevent abrasion. Since the braket 46 extends down along the lower surface of the tank, it is desirable to form a radius at 56 to prevent the occurance of sharp bending in the tank wall under vibration and shock loading conditions.

Referring to FIGURE 9, one form of winding apparatus for securing the brackets to the tank 10 includes a base 61 with a spindle support 62 at one end. A drive spindle 63 is journaled on the spindle support 62 and is driven by a suitable electric motor 64 through a V-belt drive 66. At the opposite end of the base a second spindle holder 67 is mounted in guideways 68 for movement toward and away from the drive spindle 63. A screw 69 is provided to move the spindle support 67 along the ways and maintain it in any adjusted position. A second spindle 71 is journaled on the spindle support 67 by suitable bearings so that it may rotate relative thereto. The end members 12 and 13 of the tank 10 are preferably formed with circular recesses 72 adapted to receive the two spindles 63 and 71.

To mount the tank in the winding machine, it is merely necessary to position the tank so that the drive spindle 63 extends into the recess 72 at one end of the tank and then move the spindle support 67 forward with the screw 69 until the spindle 71 extends into the other recess 72. An arm 63a is mounted on the spindle 63 and is formed with a yoke 63b which fits over the adjacent filler 18. A positive drive is therefore provided to rotate the tank. A cart 76 is provided with a plurality of spools 77 of winding filaments and a resin tank 78. The filaments from the spools 77 pass through resin 79 in the resin tank 78 under a roller 81 and through a guide 82. From the guide 82 the winding filaments extend up to the tank.

When securing the brackets 21, 36 or 46 to the tank 10, the brackets are positioned against the tank over the blanket 31 and either manually held in position or held by a suitable clamp means while the windings 32 are wrapped around the tank and bracket by rotating the tank 12. The winding is continued until the sufficient number of turns are provided.

After one bracket is mounted on the tank, the cart 76 is moved to the other end of the tank and the second bracket is mounted in the similar manner. Heat lamps 83 may be mounted adjacent to the tank to initiate the curing or setting of the resin 79. After the winding is completed, the tank and bracket assembly is removed from the winding machine and placed in a light oven to complete the curing of the resin.

Although preferred embodiments of this invention are illustrated, it is to be understood that various modifications and rearrangements of parts may be resorted to without departing from the scope of the invention as defined in the following claims.

What is claimed is:

1. A tank assembly for mounting on a frame subjected to rapid accelerations, comprising a tank formed of filament reinforced plastic resin, a metal bracket adapted to be mounted on said frame, said bracket having a modulus of elasticity substantially higher than the modulus of elasticity of the material forming said tank, said bracket being formed with a surface portion positioned adjacent the wall of said tank and extending partially therearound, filament windings wrapped around said tank and surface portion binding said bracket to said tank, and plastic resin bonding said windings in position, the modulus of elasticity of said filament windings and bonding plastic resin being substantially equal to the modulus of elasticity of the material forming said tank.

2. A tank assembly for mounting on a frame subjected to rapid accelerations comprising a tank formed of filament reinforced plastic resin, a pair of metal brackets spaced along said tank adapted to be mounted on said frame, said brackets having a modulus of elasticity substantially higher than the modulus of elasticity of the material forming said tank, each bracket being formed with a surface portion positioned adjacent the wall of said tank and extending partially therearound, a filament cushion positioned between said wall and surface portions, filament windings wrapped around said tank and surface portions binding said brackets to said tank, and plastic resin bonding said windings and cushion to said tank and bracket, the modulus of elasticity of said filament windings and cushion bonded by said plastic resin being substantially equal to the modulus of elasticity of the material forming said tank.

3. A tank assembly for mounting on the frame of a vehicle comprising a cylindrical tank formed of filaments reinforced plastic resin, a pair of metal brackets spaced axially along said tank adapted to be mounted on a vehicle frame, said brackets having a modulus of elasticity substantially higher than the modulus of elasticity of the material forming said tank, each bracket being formed with a surface portion positioned adjacent the upper wall of said tank and extending partially therearound, filament windings of a material having a modulus similar to that of the reinforcing fibers wrapped around said tank and surface portion binding said brackets to said tank, and plastic resin bonding said windings to said tank and bracket, the modulus of elasticity of said filament windings and bonding plastic resin being substantially equal to the modulus of elasticity of the material forming said tank.

4. A tank assembly for mounting on the frame of a vehicle comprising a cylindrical tank formed of filaments reinforced plastic resin, a pair of metal brackets spaced axially along said tank adapted to be mounted on a vehicle and having a modulus of elasticity substantially higher than the modulus of elasticity of the material forming said tank, each bracket being formed with a curved sector positioned adjacent the upper portion of the cylindrical wall of said tank and extending therearound through approximately 180°, filament windings wrapped around said tank and sectors binding said brackets to said tank, and plastic resin bonding said windings to said tank and bracket, the modulus of elasticity of said filament windings and the bonding plastic resin being substantially equal to the modulus of elasticity of the material forming said tank.

5. A tank assembly for mounting on the frame of a vehicle comprising a cylindrical tank formed of filaments reinforced plastic resin, a pair of metal brackets spaced axially along said tank adapted to be mounted on a vehicle and having a modulus of elasticity substantially higher than the modulus of elasticity of the material forming said tank, each bracket being formed with a curved sector positioned adjacent the upper portion of the cylindrical wall of said tank and extending therearound through approximately 180°, a blanket of filaments positioned between said sector and the wall of said tank, filament windings wrapped around said tank and sectors binding said brackets to said tank, and plastic resin bonding said blanket and windings to said tank and bracket, the modulus of elasticity of said filament windings and said blanket bonded by plastic resin being susbtantially equal to the modulus of elasticity of the material forming said tank.

6. A tank assembly for mounting on the frame of a vehicle comprising a cylindrical tank formed of filaments reinforced plastic resin, a pair of metal brackets spaced axially along said tank adapted to be mounted on a vehicle and having a modulus of elasticity substantially higher than the modulus of elasticity of the material forming said tank, each bracket being formed with a curved sector positioned adjacent the cylindrical wall of said tank and extending therearound through at least 90°, a filament blanket positioned between the wall of said tank and said sector, filament windings wrapped around said tank and sectors binding said brackets to said tank, resin bonding said winding to said tank and bracket, and baffles having flanges formed of fiber reinforced plastic resin bonded to the inner wall of said tank along the zone adjacent to said sectors.

7. A tank assembly for mounting on the frame of a vehicle comprising a cylindrical tank formed of filaments reinforced plastic resin, a pair of metal brackets spaced axially along said tank adapted to be mounted on a vehicle and having a modulus of elasticity substantially higher than the modulus of elasticity of the material forming said tank, each bracket being formed with a flange sector extending from one side thereof and positioned adjacent the cylindrical wall of said tank, said flange sector extending around said tank through an angle of at least 90°, filament windings wrapped around said tank and flange sector binding said brackets to said tank, and resin bonding said windings to said tank and bracket, the modulus of elasticity of said filament windings and the resin bonding said windings being substantially equal to the modulus of elasticity of the material forming said tank.

8. A tank assembly for mounting on the frame of a vehicle comprising a cylindrical tank formed of filaments reinforced plastic resin, a pair of metallic brackets spaced axially along said tank adapted to be mounted on a vehicle and having a modulus of elasticity substantially higher than the modulus of elasticity of the material forming said tank, each of said brackets being formed with a flange sector positioned adjacent the cylindrical wall of said tank and extending therearound through at least 90°, said flange sector being formed with a curved wall extending away from said tank adjacent at least one end of said flange sector, filament windings wrapped around said tank and flange sector binding said brackets to said tank, and resin bonding said windings to said tank and bracket.

9. A tank assembly for mounting on the frame of a vehicle comprising a cylindrical tank formed of filaments reinforced plastic resin, a pair of metallic brackets spaced axially along said tank each formed with a U-shaped sector positioned adjacent the cylindrical wall of said tank and extending therearound through at least 90°, filament windings wrapped around said tank and sector binding said brackets to said tank, resin bonding said winding to said tank and bracket, and U-shaped mounting elements connected to both sides of said bracket adapted to connect said brackets to a vehicle.

(References on following page)

References Cited by the Examiner

UNITED STATES PATENTS

| | | | |
|---|---|---|---|
| 207,016 | 8/1878 | Cook | 220—1 |
| 1,720,968 | 7/1929 | Schmidt | 156—172 |
| 2,566,299 | 9/1951 | Abbott. | |
| 2,693,291 | 11/1954 | Alderfer | 220—3 |
| 2,718,583 | 9/1955 | Noland et al. | |
| 2,736,449 | 2/1956 | Bruderer. | |
| 2,744,043 | 5/1956 | Ramberg. | |
| 2,862,541 | 12/1958 | Brink | 156—172 |
| 2,941,915 | 6/1960 | Manning. | |
| 2,984,379 | 5/1961 | Borzsei | 220—3 |
| 3,112,234 | 11/1963 | Krupp | 156—175 |

EARL M. BERGERT, *Primary Examiner.*

FRANKLIN T. GARRETT, *Examiner.*

R. J. CARLSON, P. DIER, *Assistant Examiners.*